US00RE44041E

(19) United States
(12) Reissued Patent
Ishii et al.

(10) Patent Number: US RE44,041 E
(45) Date of Reissued Patent: Mar. 5, 2013

(54) MEDIUM TRANSPORTING DEVICE AND RECORDING APPARATUS

(75) Inventors: Takayuki Ishii, Nagano (JP); Yoshitaka Shimada, Nagano (JP)

(73) Assignee: Seiko Epson Corporation, Tokyo (JP)

(21) Appl. No.: 12/818,004

(22) Filed: Jun. 17, 2010

Related U.S. Patent Documents

Reissue of:
(64) Patent No.: 7,390,085
Issued: Jun. 24, 2008
Appl. No.: 10/793,642
Filed: Mar. 5, 2004

(30) Foreign Application Priority Data

Mar. 7, 2003 (JP) ..... 2003-062535
Mar. 7, 2003 (JP) ..... 2003-062538

(51) Int. Cl.
*B41J 2/01* (2006.01)

(52) U.S. Cl. ..... 347/104; 400/635; 271/276

(58) Field of Classification Search ..... 347/104, 347/101, 103, 102, 100, 220; 400/635, 648; 271/276
See application file for complete search history.

(56) References Cited

U.S. PATENT DOCUMENTS 6,254,092 B1 * 7/2001 Yraceburu et al. ..... 271/276
6,270,215 B1 8/2001 Miyasaka et al.
6,367,999 B1 4/2002 Juan et al.
6,554,415 B2 4/2003 Juan
6,729,720 B2 5/2004 Miki et al.
6,789,890 B2 * 9/2004 Bruhn et al. ..... 347/104
6,957,887 B2 * 10/2005 Bruhn ..... 347/104
2001/0028380 A1 10/2001 Wotton et al.
2002/0047885 A1 * 4/2002 Miyawaki et al. ..... 347/104
2002/0167578 A1 * 11/2002 Miki et al. ..... 347/104
2003/0085979 A1 * 5/2003 Ishii et al. ..... 347/104
2003/0085980 A1 * 5/2003 Ishii et al. ..... 347/104
2004/0174421 A1 * 9/2004 Tsuji ..... 347/104

FOREIGN PATENT DOCUMENTS

EP 0 997 302 A1 5/2000
EP 1 123 809 A2 8/2001
EP 1 182 041 A1 2/2002
JP 63-303781 A 12/1988
JP 3-270 A 1/1991
JP 08-156351 A 6/1996
JP 09220837 A * 8/1997
JP 2000-016637 A 1/2000
JP 2000-135825 A 5/2000
JP 2002-127516 A 5/2002
JP 2002127516 A * 5/2002
JP 2002-225358 A 8/2002

OTHER PUBLICATIONS

State Intellectural Property Office of People's Republic of China Office Action, 200410028230.5, Nov. 25, 2005, Seiko Epson Corporation.

* cited by examiner

*Primary Examiner* — Manish S Shah
(74) *Attorney, Agent, or Firm* — Sughrue Mion, PLLC

(57) ABSTRACT

On a medium transporting surface, a dimple extending continuously from a transportation upstream end of a medium to a transportation downstream end are formed. Hereby, a leading end of the medium, after pulled into the dimples once, is transported in the pulled state. Therefore, it is prevented that the leading end of the medium is curled up by a conventional partition wall provided in the direction perpendicular to the medium transporting direction, so that it is possible to prevent a stain on the medium caused by contact with a recording head.

16 Claims, 9 Drawing Sheets

MEDIUM TRANSPORTING DEVICE AND RECORDING APPARATUS

Matter enclosed in heavy brackets [ ] appears in the original patent but forms no part of this reissue specification; matter printed in italics indicates the additions made by reissue.

The present application is based on Japanese Patent Applications Nos. 2003-62538 and 2003-62535, the entire contents of which are incorporated herein by reference.

BACKGROUND OF THE INVENTION

The present invention relates to a medium transporting device which transports a medium and a recording apparatus provided with this medium transporting device.

Heretofore, for example, in an ink jet printer that is one of recording apparatuses, while paper that is one of recording media is being fed into a recording section by a paper transporting device, recording is performed and thereafter the paper is fed out to the outside. In such the ink jet printer, while the paper is fed in a state where it is held between a feed roller and its driven roller, recording is performed in a recording head, and thereafter the paper is fed out in a state where it is held by a discharge roller and a spur roller functioning as its driver roller, and discharged.

In the ink jet printer including such the paper transporting device, in case that an image composed of ejected many ink droplets, for example, a solid image is recorded on the paper, the paper absorbs a large amount of ink, so that it bulges toward the recording head in the wavy shape after recording, that is, cockling is produced. As this cockling develops, the distance between the paper and the recording head becomes more uneven, and unevenness is produced in ink splash distance, whereby unevenness is produced in recording, or the paper comes into contact with the recording head and stains. Therefore, recently, an ink jet printer has been proposed, in which plural openings are formed on a paper transporting surface in the paper transporting direction and in the direction perpendicular to the paper transporting direction at a regular pitch, that is, the plural openings are provided in the shape of a grid, and the paper is sucked through these opening by a suction pump thereby to suppress the above cockling (refer to JP-A-63-303781 and JP-A-3-270).

In the ink jet printers including the above conventional suction type paper transporting device, there is an ink jet printer having a dimple around each opening in order to heighten suction force determined by negative pressure×area. However, since the dimples are formed in the shape of a grid correspondingly to each opening, a partition wall exists between the dimples. Therefore, after [a leading end of the paper] *a medium* was pulled into the dimples once, it is curled up by the partition walls provided in the direction perpendicular to the paper transporting direction, so that there is fear that it comes into contact with the recording head and stains.

Further, in the ink jet printers including the above conventional suction type paper transporting device, through-holes are only opened on the paper transporting surface to suck the paper. Therefore, it is difficult to suppress cockling throughout the entire surface in the recording section by a proper amount of suction force. On the contrary, in case that the suction force is too strong, though cockling can be suppressed throughout the entire surface, decrease of feeding accuracy can be caused.

SUMMARY OF THE INVENTION

A first object of the invention is to prevent curling-up of [the leading end of] the medium when the medium is transported.

Further, a second object of the invention is to suppress the influence of cockling when the medium is transported.

In order to achieve the objects, according to the first aspect of the invention, a medium transporting apparatus, which transports a medium supplied onto a medium transporting surface, sucking the medium, is characterized in that a dimple extending continuously from a transportation upstream end of the medium to a transportation downstream end thereof is formed on the medium transporting surface. Hereby, the leading end of the medium, after pulled into the dimples once, is transported in the pulled state. Therefore, it is prevented that the leading end of the medium is curled up by the conventional partition walls provided in the direction perpendicular to the medium transporting direction, so that it is possible to prevent a stain on the medium caused by contact with a recording head.

Further, a medium transporting apparatus according to the second aspect of the invention is characterized in that the dimple is formed so that its depth on the transportation downstream side becomes larger than that on the transportation upstream side. Hereby, even by a proper amount of suction force, a concave portion of cockling produced immediately after recording and a concave portion of cockling produced after completion of recording are pulled into the dimples, and the medium can be sucked and transported. Therefore, protrusion of a convex portion of cockling from the medium transporting surface can be suppressed, and the distance between the medium and the recording head can be kept uniform.

Further, a medium transporting apparatus according to the third aspect of the invention is characterized in that plural dimples are arranged in parallel in the direction perpendicular to the medium transporting direction. Hereby, the wavy concave portion of cockling can be surely pulled into the dimples, so that protrusion of the wavy convex portion of cockling from the medium transporting surface can be surely suppressed.

Further, a medium transporting apparatus according to the fourth, fifth or sixth aspects of the invention is characterized that the dimple is formed so as to gradually become deeper from the transportation upstream side of the medium toward the transportation downstream side. Further, it is characterized in that the dimple is formed so as to gradually become deeper up to the predetermined distance from the transportation upstream end of the medium toward the transportation downstream end, and formed so that the depth of the further part from the predetermined distance becomes constant up to the transportation downstream end of the medium. Further, it is characterized in that the dimple is formed so that the dimple of the predetermined length from the transportation upstream end of the medium toward the transportation downstream end is formed with a first depth and the further part from the predetermined distance is formed with a second depth that is larger than the first depth up to the transportation downstream end of the medium. Hereby, the concave portion of cockling which becomes largest in dry after recording can be surely pulled into the dimples, so that protrusion of the convex portion of cockling from the medium transporting surface can be nearly suppressed completely.

A medium transporting apparatus according to the seventh aspect of the invention, including plural suction openings provided on the medium transporting surface, a pressure reduction chamber communicating with the plural suction openings, and a suction device which sucks air in the pressure reduction chamber, is characterized in that the suction opening is provided with a suction unit including a suction hole communicating with the pressure reduction chamber and a suction chamber in which the area of a suction surface opposed to the medium is larger than the cross-section of the suction hole, and the suction chamber functions as the dimple. Hereby, flow velocity of air on the downside of the medium which has approached on the suction chamber becomes high and the negative pressure is increased. Therefore, even if cockling is produced in the medium, it is possible to suck the medium into the suction chamber completely. Further, since a proper amount of suction force is produced by the suction chamber, the transporting device can suck and transport the medium, keeping feed accuracy of the medium high.

In order to achieve the above objects, a liquid jet apparatus according to the eighth aspect of the invention is characterized by including a jetted material transporting device having the above each function of the medium transporting device according to any one of the first to seventh aspects. Hereby, it is possible to provide the liquid jet apparatus taking the above each working effect.

In order to achieve the above objects, a recording apparatus according to the ninth aspect of the invention is characterized by including the medium transporting device according to any one of the first to eighth aspects. Hereby, it is possible to provide the recording apparatus taking the above each working effect.

DESCRIPTION OF THE PREFERRED EMBODIMENTS

Embodiments of the invention will be described below with reference to drawings.

Figure 1:
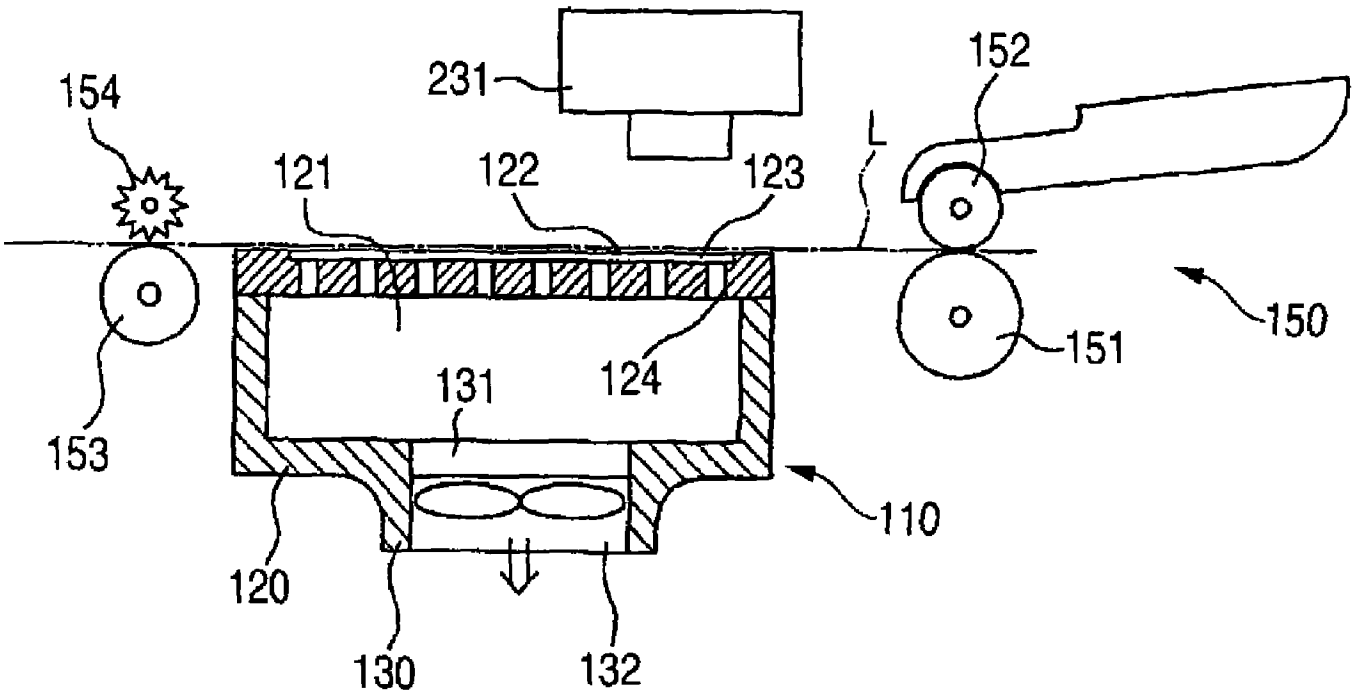
FIG. 1 is a side view showing a medium transporting device according to an embodiment of the invention.

FIG. 1 is a side view showing a recording medium transporting device that is one of medium transporting apparatuses according to an embodiment of the invention. This recording medium transporting device 100 includes a suction unit 110 which sucks and holds a recording medium at the recording time, and a recording medium transporting unit 150 which transports the recording medium from the upstream side of the suction unit 110 to the downstream. The suction unit 110 is arranged below a recording head 231 for recording data on the recording medium, forming a recording medium transporting path L therebetween. Further, the suction unit 110 is formed in the shape of a hollow box having up-and-down two-stage structure comprising a suction part 120 of the upper stage and a suction force generating part 130 of the lower stage.

A first embodiment of the suction part 120 will be described. The suction part 120 comprises a pressure reduction chamber 121 formed inside, plural suction chambers 123 which are formed on a recording medium transporting surface 122 in the shape of a rectangular recess that is long in the transporting direction of the recording medium and which are characteristic parts of the invention, and plural suction holes 124 which have circular and smaller cross-section than the suction chambers 123 extending up and down so as to communicate these suction chambers 123 respectively with the pressure reduction chamber 121.

Figure 2A:
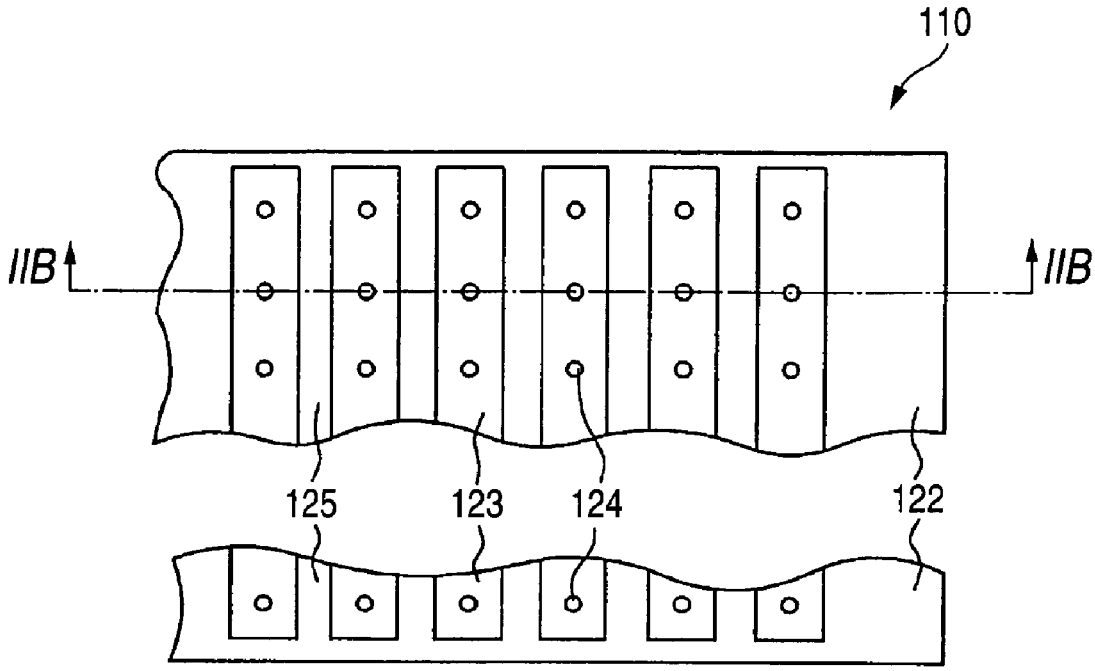
FIGS. 2A and 2B are a plan view and a sectional side view taken along a line IIB-IIB of FIG. 2A, which show a first embodiment of a suction part in FIG. 1.
Figure 2B:
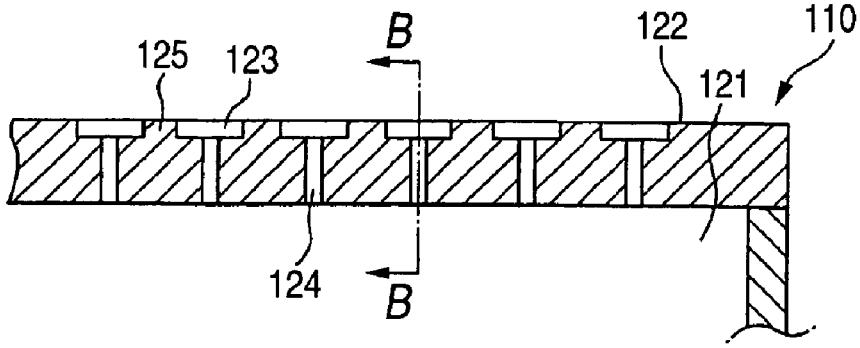

FIGS. 2A and 2B are plan view of the suction part 120 in the first embodiment and a sectional side view taken along a line IIB-IIB of FIG. 2A. The suction chamber 123 is formed so that its short side has the predetermined length and its long side has the length leading from the neighborhood of an upstream end of the recording medium transporting surface 122 to the neighborhood of a downstream end. Namely, each suction chamber 123 extends continuously in the transporting direction of the recording medium, and the suction chambers 123 are arranged in the direction perpendicular to the transporting direction of the recording medium with a partition wall therebetween. The suction holes 124 are formed on the bottom surface of the suction chamber 123 in the transporting direction of the recording medium at the predetermined pitch. Namely, the suction holes 124 are formed for each suction chamber 123 in a row.

As described above, since each suction chamber 123 does not have the partition wall in the transporting direction of the recording medium but is formed so as to extend continuously, a leading end of the recording medium, after pulled into the dimple-like suction chambers 123 once, is transported in the pulled state. Therefore, it is prevented the leading end of the recording medium is curled up by the convention partition wall provided in the direction perpendicular to the transporting direction of the recording medium, so that it is possible to prevent a stain on the recording medium caused by contact with the recording head 231.

Here, since the suction chamber 123 is formed so that its long side has the length leading from the neighborhood of the upstream end of the recording medium transporting surface 122 to the neighborhood of the downstream end, till the leading end of the recording medium reaches the downstream end of the recording medium transporting 122, a state where only a part of the suction chamber 123 is covered with the recording medium continues. Therefore, there is fear of bad absorption-transportation due to lowering of the suction force. However, on the lower surface of the leading end of the recording medium, negative pressure by dynamic pressure loss caused by air flow between the lower surface of the recording medium and the bottom surface of the suction chamber 123 due to the suction hole 124 and by dynamic pressure loss of the suction hole 124 itself is produced. Therefore, it is possible to suck the leading end of the recording medium stably and transport it. A result of investigation on this point will be described in reference with FIGS. 3A and 3B.

Figure 3A:
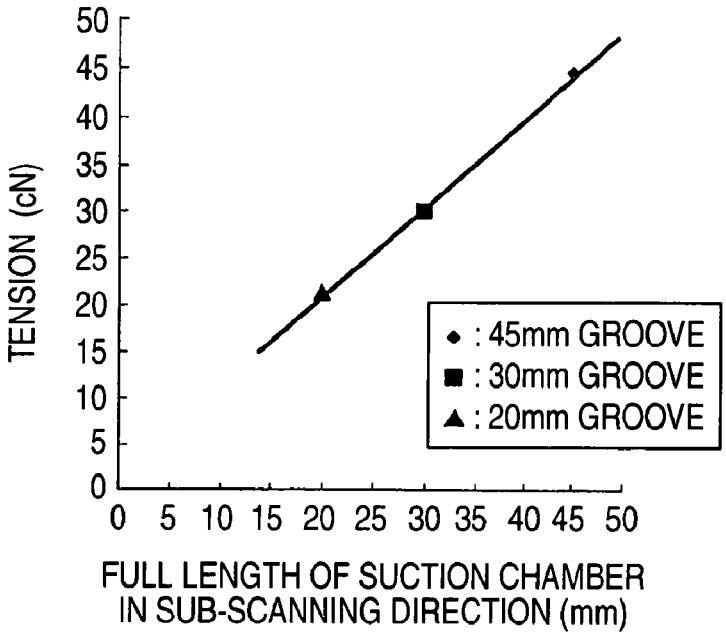
FIG. 3 is a diagram showing tension power acting on the medium when a suction chamber is covered with the medium.
Figure 3B:
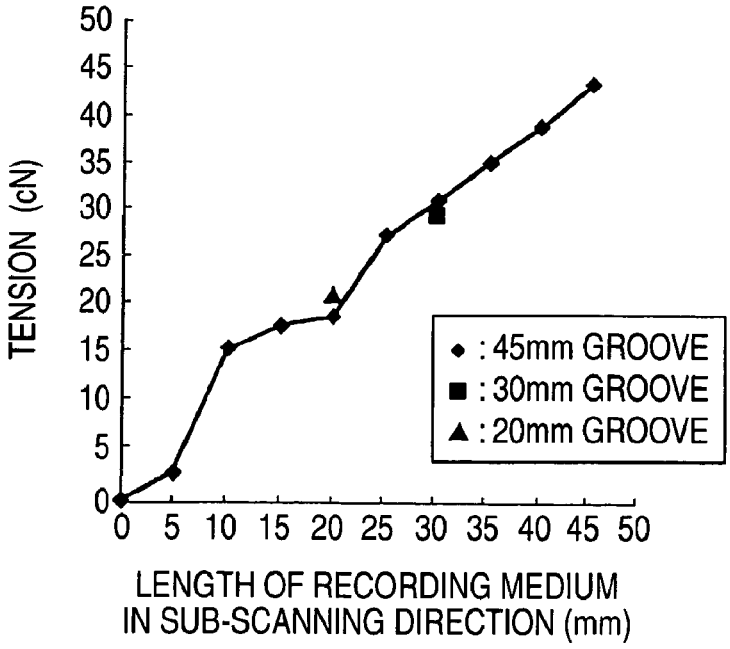

FIG. 3A is a diagram showing tension acting on the recording medium when the whole of each suction chamber 123 is covered with the recording medium in case that the lengths of the long side of the suction chamber are different, and FIG. 3B is a diagram showing the change of tension acting on the recording medium when the suction chambers 123 are gradually covered with the recording medium in case that the long side of the suction chamber 123 has the predetermined length. As shown in FIG. 3A, in case that the full lengths of the long side of the suction chamber 123, that is, the full lengths of the suction chamber 123 in the transporting direction of the recording medium (sub-scanning direction) are 20 mm, 30 mm, and 45 mm, when the whole of each suction chamber 123 is covered with the recording medium, the tension acting on the recording medium become about 20 cN, about 30 cN, and about 45 cN. Namely, it has been proved that the tension increases linearly.

Further, as shown in FIG. 3B, in case that the long side of the suction chamber 123, that is, the full length of the suction chamber 123 in the transporting direction of the recording medium (in the sub-scanning direction) is 45 mm, when the suction chambers 123 are gradually covered with the recording medium, it has been proved that the tension acting on the recording medium nearly increases linearly. Further, it has been proved that the tension acting on the recording medium when the full lengths of the suction chamber 123 are 20 mm and 30 mm, which are shown in FIG. 3A, nearly get on the graph shown in FIG. 3B.

Accordingly, before the leading end of the recording medium reaches the downstream end of the recording medium transporting surface 122, even if only a part of the suction chamber 123 is covered with the recording medium, that is, the suction chamber 123 on the leading end side of the recording medium is in the open state, on the lower surface of the leading end of the recording medium, the negative pressure by the dynamic pressure loss caused by the air flow between the lower surface of the recording medium and the bottom surface of the suction chamber 123 due to the suction hole 124 and by the dynamic pressure loss of the suction hole 124 itself is produced. Therefore, it is possible to suck the leading end of the recording medium stably and transport it.

The suction force generating part 130 is communicated with the pressure reduction chamber 121 of the suction part 120 through a communication hole 131, and includes a pump 132 having a centrifugal fan inside. The pump 132 is attached in the predetermined position below the pressure reduction chamber 121 in a state where it communicates with the pressure reduction chamber 121 through the communication hole 131, and the centrifugal fan turns at the recording time.

The recording medium transporting unit 150 comprising a feed roller 151 which feeds the recording medium between the recording head 231 and the suction unit 110, a driven roller 152 which is brought into pressure-contact with this feed roller 151 from the upside, a discharge roller 153 which discharges the recording medium to the outside, and a spur roller 154 which is brought into contact with this discharge roller 153 from the upside. In case of the constitution in which the suction unit 110 can be moved in the discharge direction, the discharge roller 153 and the spur roller 154 may not be provided.

As described above, the suction opening is composed of the suction hole 124 and the suction chamber 123, and further the suction hole 124 is formed into the through-hole having the small diameter, whereby coefficient of utilization of the negative pressure which can be utilized in relation to the characteristic of the pump 132 is heightened. Further, the suction chamber 123 is formed as the nearly rectangular recess that is larger in area than the suction hole 124, whereby the large suction force can be generated in relation to the recording medium. Further, each suction chamber 123 does not include the partition wall in the transporting direction of the recording medium and the suction chamber 123 is formed so that its long side has the length leading from the neighborhood of the upstream end of the recording medium transporting surface 122 to the neighborhood of the downstream end. Therefore, the leading end of the medium, after pulled into the suction chambers 123 once, is transported in the pulled state. Therefore, it is prevented that the leading end of the medium is curled up by the conventional partition wall provided in the direction perpendicular to the paper transporting direction, so that it is possible to prevent a stain on the medium caused by contact with the recording head 231.

The thus constructed recording medium transporting device 100 operates as follows: The feed roller 151 rotates and feeds the recording medium between the recording head 231 and the suction unit 110. On the other hand, the pump 132 operates and applies the suction force through the communication hole 131 and the pressure reduction chamber 121 to the suction hole 124 and the suction chamber 123. Hereby, the recording medium is transported in a state where it is sucked on the recording medium transporting surface 122. Simultaneously, the recording head 231, moving in a main scanning direction above the recording medium, ejects an ink droplet on the recording medium to perform recording.

At this time, since the leading end of the recording medium, after pulled into the dimple-like suction chambers 123 once, is transported in the pulled state, the distance between the recording medium and the recording head 231 becomes uniform. Therefore, unevenness in recording due to unevenness in splash distance of the ink droplet, and the stain on the recording medium due to the contact with the recording head 231 can be prevented. Next, the discharge roller 153 rotates and discharges the recording medium on which recording has been completed to the outside.

Next, a second embodiment of the suction part 120 will be described.

Up to now, the recording medium has come up and protruded on the recording medium transporting surface by generation of cockling which waves in the direction perpendicular to the transporting direction of the recording medium. In the invention, the dimple-like suction chambers 123 are formed on the recording medium transporting surface 122 so as to arrange in the direction perpendicular to the transporting direction of the recording medium with the partition wall 125 between. Therefore, the concave portion of the cockling can be pulled into the dimple-like suction chambers 123, and the convex portion of the cockling can be fitted to the top of the partition wall 125. Accordingly, it is possible to suppress the protrusion of the recording medium from the recording medium transporting surface 122, and the distance between the recording medium and the recording head 231 is made uniform, whereby recording accuracy can be heightened. However, it has been proved that the unevenness state of cockling of the recording medium changes as the time passes since recording has been started.

Figure 4:
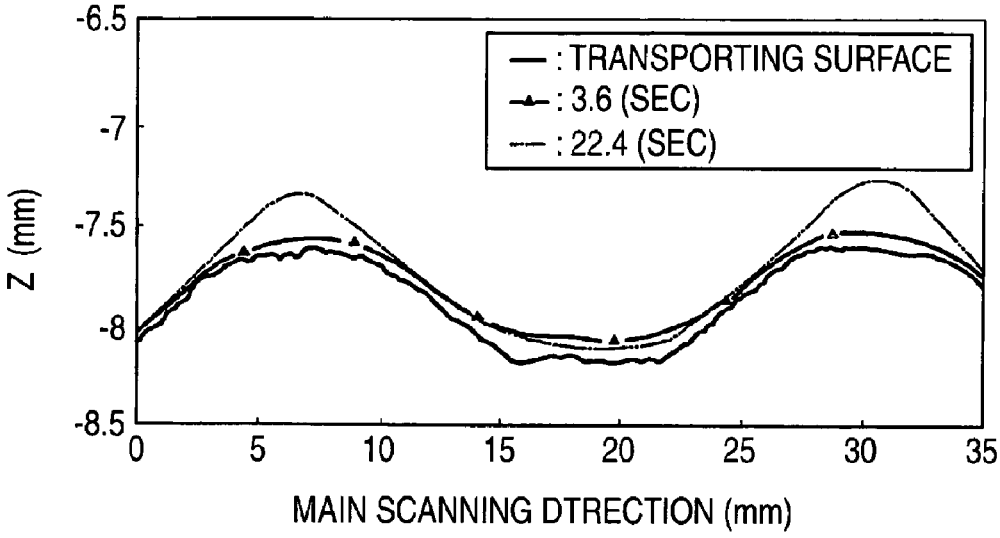
FIG. 4 is a diagram showing the unevenness state of cockling of the medium after the predetermined time passed since recording has been started.

FIG. 4 is a diagram showing the unevenness state of cockling of the recording medium after the predetermined time has passed since recording has been started. In FIG. 4, a solid line represents the unevenness state of the recording medium transporting surface 122 in the main scanning direction, and the depth of the suction chamber 123 in this example is about 0.5 mm. As shown by dot-dash lines, amplitude of the unevenness of the cockling of the recording medium after 3.6 sec. passed since recording has been started is about 0.46 mm, and the protrusion of the recording medium from the recording medium transporting surface 122 can be prevented completely. However, as shown by two dot-dash lines, amplitude of the unevenness of the cockling of the recording medium after 22.4 sec. passed since recording has been started develops into about 0.7 mm, and the recording medium protrudes from the recording medium transporting surface 122.

Therefore, measurement on motion of cockling in various recording media and under various environments has been performed. In result, it has been proved that deformation of the recording medium that gets only wet due to attachment of ink is small, growth of deformation of the recording medium starts as dry of ink starts, and the deformation of the recording medium tends toward contraction as the dry of ink further advances. The peak of the deformation of the recording medium may achieve usually when the region of recording completion of the recording medium has moved to the transportation downstream side and exists in the moving region in the main scanning direction (direction perpendicular to the transporting direction of the recording medium) of the carriage on which the recording head 231 is mounted.

Therefore, by setting the depth of the suction chamber 123 in the region on the transportation downstream side from this deformation peak portion of the recording medium larger than the depth of the suction chamber 123 in the region on the transportation upstream side from the deformation peak portion, the protrusion of the recording medium from the recording medium transporting surface 122 can be completely prevented, and the distance between the recording medium and the recording head 231 can be made more uniform thereby to heighten the recording accuracy more. In order to specify the deformation peak portion of the recording medium, the following investigation has been performed.

Figure 5:
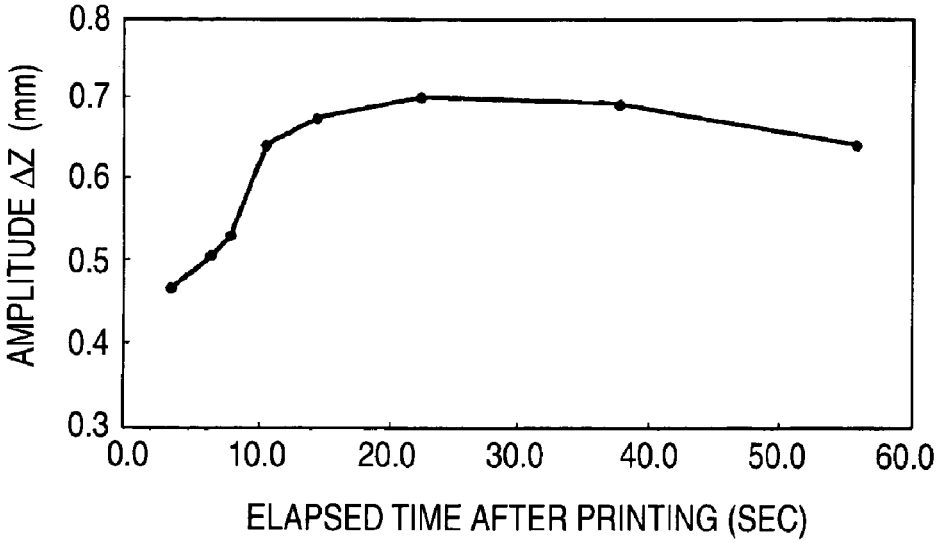
FIG. 5 is a diagram showing a change with the passage of time regarding amplitude of the unevenness of cockling of the medium after start of recording.

FIG. 5 is a diagram showing a change with the passage of time regarding the amplitude of the unevenness of cockling of the recording medium after start of recording. As clear from FIG. 5, the amplitude of the unevenness of cockling of the recording medium becomes large sharply immediately after start of recording. After the predetermined time has passed, the amplitude is kept at a constant value (about 0.7 mm). The peak of the deformation of the recording medium is produced most early when high duty recording has been performed under the environment of high temperature and low humidity, and when about 10 sec. passed since recording has started.

Therefore, a diverting point of the depth on the transportation upstream side of the suction chamber 123 and the depth on the transportation downstream side thereof is set on the basis of the time elapsed since recording has started, and it is preferable that this base time is about 10 sec. or more. By multiplying this base time by the medium transporting speed, the distance from a recording start point on the recording medium transporting surface 122 to a deformation peak point is obtained. Next, by adding to this distance the distance from the transportation upstream end on the recording medium transporting surface 122 to the recording start point, the diverting point of the depth on the transportation upstream side of the suction chamber 123 and the depth on the transportation downstream side thereof is obtained, and the suction chamber 123 is formed correspondingly.

Figure 6A:
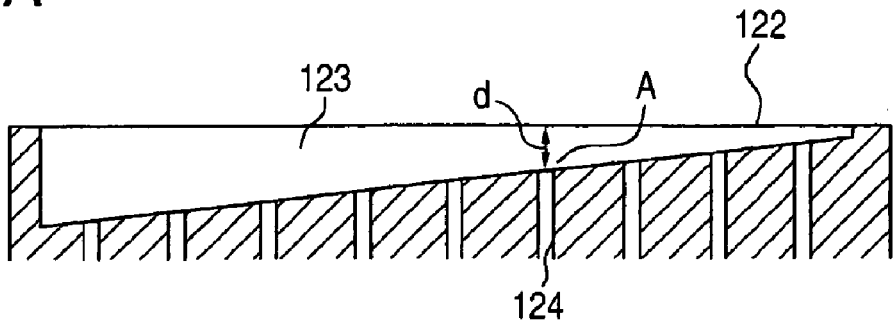
FIG. 6 is a sectional side view taken along a line of B-B in FIG. 2, which shows a second embodiment of the suction part in FIG. 1.
Figure 6B:
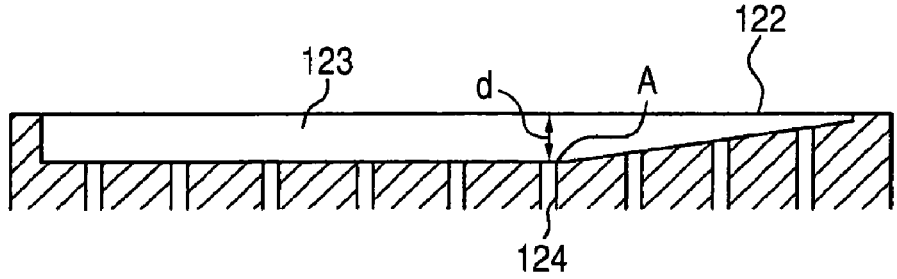
Figure 6C:
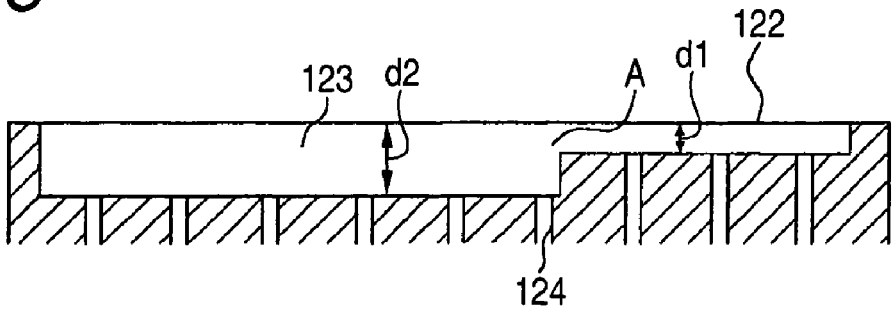

FIGS. 6A, 6B, and 6C are sectional side views taken along a line B-B in FIG. 2B, showing examples of sectional shapes of the suction chamber 123 according to the second embodiment, in which the same components as those in the first embodiment are denoted by the same reference numerals. The suction chamber 123 shown in FIG. 6A is formed so as to become deeper gradually from the transportation upstream side toward the transportation downstream side so that the depth d of a diverting point A of the depth on the transportation upstream side of the suction chamber 123 and the depth on the transportation downstream side thereof becomes a peak value of the deformation of the recording medium. Further, the suction chamber 123 shown in FIG. 6B is formed so as to become deeper gradually from the transportation upstream side to the diverting point A and formed constantly at the depth d from the diverting point A toward the transportation downstream side so that the depth d of the diverting point A of the depth on the transportation upstream side of the suction chamber 123 and the depth on the transportation downstream side thereof becomes the peak value of the deformation of the recording medium. Further, the suction chamber 123 shown in FIG. 6C is constantly formed at a depth d1 that becomes the peak value of the deformation of recording medium from the transportation upstream side to the diverting point A, and formed constantly at a depth d2 that is larger than the depth d1 from the diverting point A toward the transportation downstream side. Hereby, the concave portion of the cockling which becomes largest in dry after recording can be pulled into the dimple-like suction chambers 123 formed deeply, and the convex portion of the cockling can be fitted to the top of the partition wall 125. Accordingly, it is possible to nearly suppress the protrusion of the recording medium from the recording medium transporting surface 122 completely, and the distance between the recording medium and the recording head 231 is made uniform, whereby recording accuracy can be heightened.

The thus constructed recording medium transporting device 100 operates as follows: The feed roller 151 rotates and feeds the recording medium between the recording head 231 and the suction unit 110. On the other hand, the pump 132 operates and applies the suction force through the communication hole 131 and the pressure reduction chamber 121 to the suction hole 124 and the suction chamber 123. Hereby, the recording medium is transported in a state where it is sucked on the recording medium transporting surface 12. Simultaneously, the recording head 231, moving in the main scanning direction above the recording medium, ejects an ink droplet on the recording medium to perform recording.

At this time, since the concave portion of cockling which becomes largest in dry after recording is surely pulled into the dimple-like suction chambers 123 formed deeply, and the convex portion of cockling is fitted to the top of the partition wall 125, the distance between the recording medium and the recording head 231 becomes uniform. Therefore, unevenness in recording due to unevenness in splash distance of the ink droplet, and the stain on the recording medium due to the contact with the recording head 231 can be prevented. Next, the discharge roller 153 rotates and discharges the recording medium on which recording has been completed to the outside.

Figure 7:
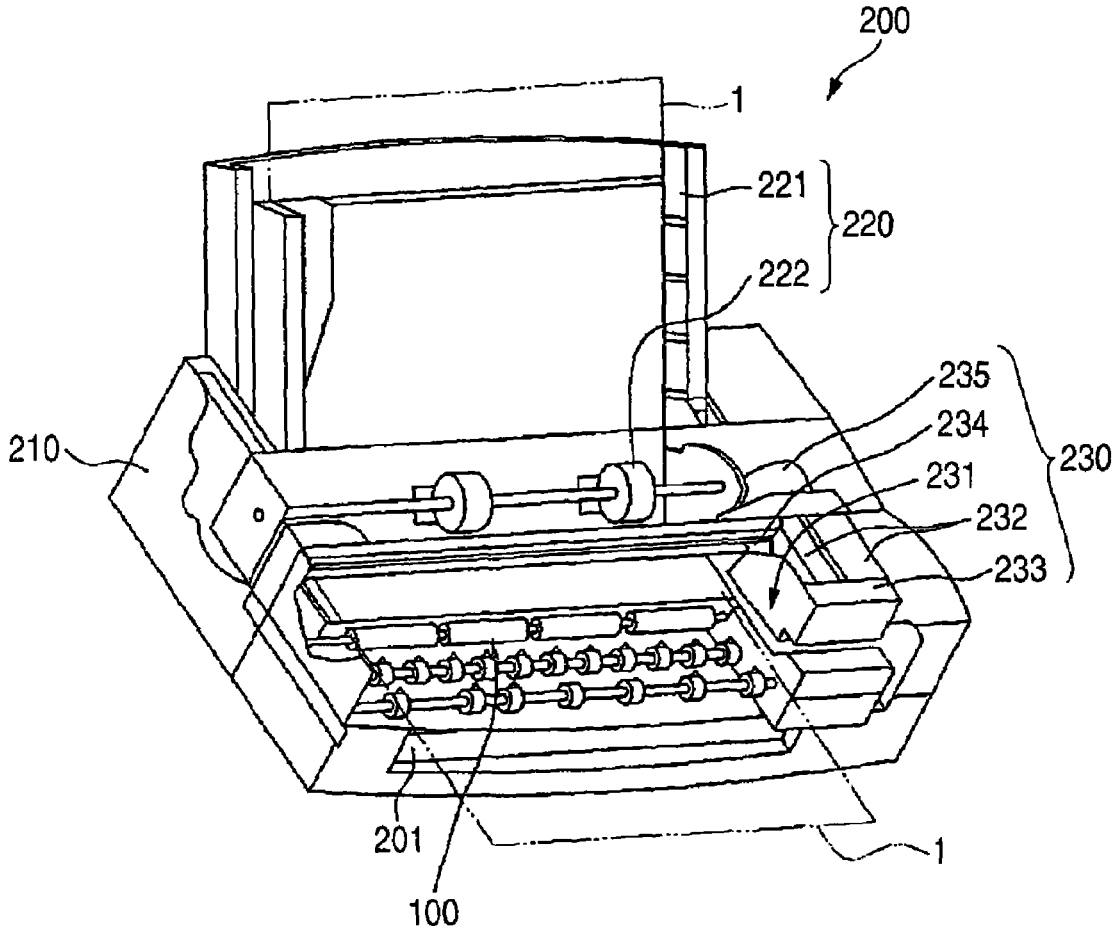
FIG. 7 is a perspective view showing an ink jet printer as a recording apparatus provided with the medium transporting device of the invention.
Figure 8:
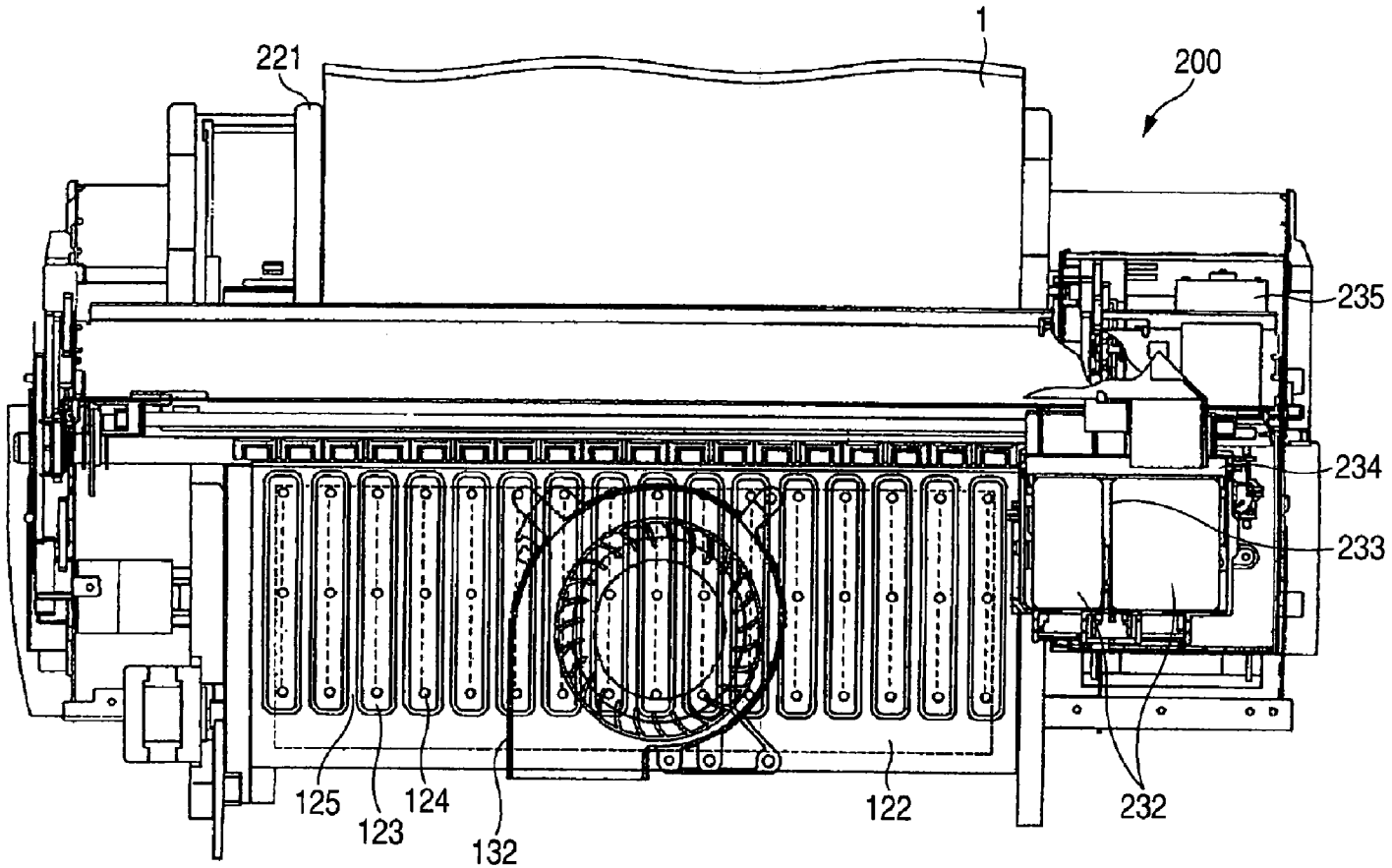
FIG. 8 is a plan view showing a main part of the ink jet printer in FIG. 7.
Figure 9:
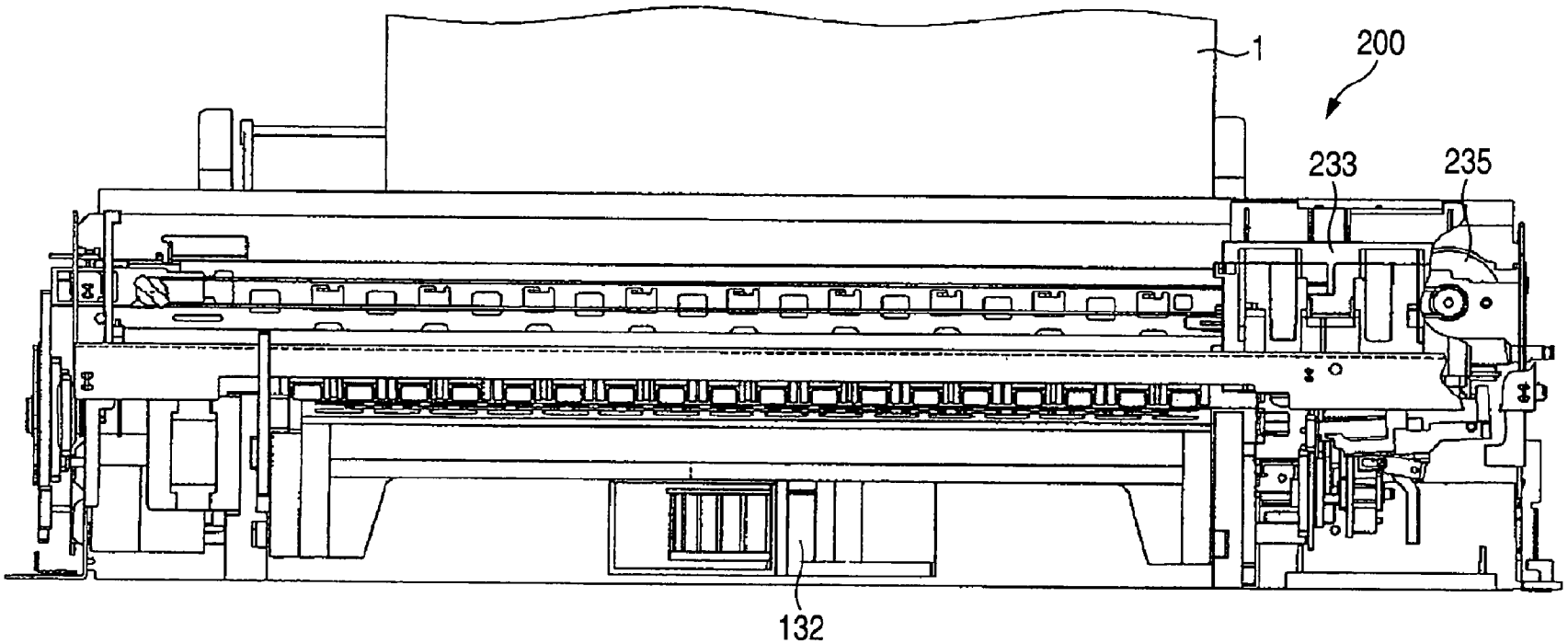
FIG. 9 is a front view showing the main part of the ink jet printer in FIG. 7.
Figure 10:
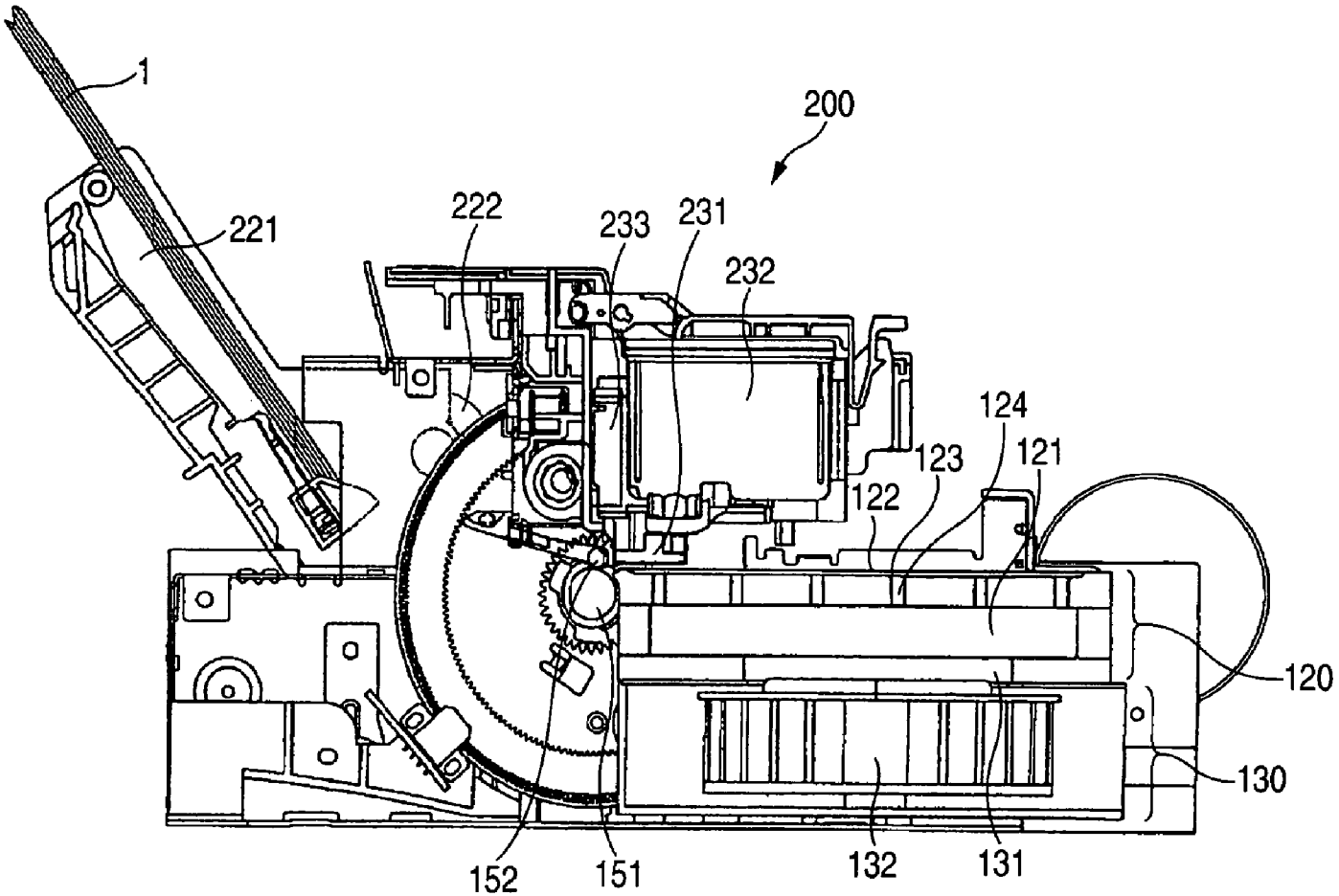
FIG. 10 is a side view showing the main part of the ink jet printer in FIG. 7.

FIG. 7 is a perspective view of an ink jet printer as a recording apparatus provided with the above recording medium transporting device 100, and FIGS. 8 to 10 are a plan view, a front view, and a side view which show a main part of the ink jet printer. This ink jet printer 200 comprises an automatic supply feeding (ASF) unit 220 aslant attached to the backward upper portion of a printer body 210, a recording part 230 included in the printer body 210, and the recording medium transporting device 100. As a recording medium, paper for the ink jet printer 200, plain paper, an OHP film, tracing paper, and a post cart can be used.

The ASF unit 220 comprises a tray 221 in which paper 1 is housed, and a supply roller 222 which pulls out the paper 1 from this tray 221 and supplies it. The recording part 230 comprises a carriage 233 on which a recording head 231 and an ink cartridge 232 are mounted, and a DC motor 235 which moves this carriage 233 along a guide shaft 234 arranged in the main scanning direction. The recording head 231 has a nozzle array comprising plural nozzles, for example, ninety-six nozzles for each color of cyan, magenta, yellow, light cyan, light magenta, dark yellow, and black.

The recording medium transporting device 100 includes the suction unit 110 comprising the suction part 120 of the upper stage which sucks and holds the recording medium at the recording time and the suction force generating part 130 of the lower stage, and the recording medium transporting unit 150 which transports the recording medium from the upstream side of the suction unit 110 to the downstream. In case of the first embodiment, the suction part 120 comprises the pressure reduction chamber 121 formed inside, the plural suction chambers 123 which are formed on the recording medium transporting surface 122 in the shape of a rectangular recess that is long in the transporting direction of the recording medium, and the plural suction holes 124 which communicate these suction chambers 123 respectively with the pressure reduction chamber 121.

Further, in case of the second embodiment, the suction chamber 123, as shown in FIG. 6A, is formed so as to become deeper gradually from the transportation upstream side toward the transportation downstream side so that the depth d of the diverting point A of the depth on the transportation upstream side of the suction chamber 123 and the depth on the transportation downstream side thereof becomes the peak value of the deformation of the recording medium.

As described foregoing, the recording medium transporting unit 150 includes the feed roller 151 which feeds the recording medium between the recording head 231 and the suction unit 110, and the driven roller 152 which is brought into pressure-contact with this feed roller 151 from the upside. This ink jet printer 200 has the suction unit 110 which can move in the discharge direction and is not provided with the discharge roller 153 which discharges the recording medium to the outside and the spur roller 154 brought into contact with the discharge roller 153 from the upside as shown in FIG. 1. However, the ink jet printer having the discharge roller 153 and the spur roller 154 may be used.

The thus constructed ink jet printer 200 operates as follows. When a recording instruction on the paper 1 housed in the tray 221 is input from a not-shown host computer, the supply roller 222 rotates and picks up the paper housed in the tray 221 one by one to supply it. Further, the feed roller 152 rotates and feeds the paper 1 between the recording head 231 and the suction unit 110.

On the other hand, the pump 132 operates, and applies the suction force through the communication hole 131 and the pressure reduction chamber 121 to the suction hole 124 and the suction chamber 123. Hereby, the paper 1 is transported in the state where it is sucked on the recording medium transporting surface 125. Simultaneously, the DC motor operates, and moves the carriage 233 through a timing belt along the guide shaft 234. At this time, the recording head 231 ejects ink of each color supplied from the ink cartridge 232 as a minute ink droplet on the paper 1 from all or a part of the plural nozzles according to recording data thereby to record the data. In case of the first embodiment, since the leading end of the recording medium, after pulled into the suction chambers 123 once, is transported in the pulled state, the distance between the recording medium and the recording head 231 becomes uniform, so that recording can be performed at high accuracy.

Further, in case of the second embodiment, though cockling may be produced in the paper 1 after recording, the concave portion of cockling is pulled into the dimple-like suction chambers 123, and the convex portion of cockling is fitted to the top of the partition wall 125. Accordingly, the distance between the recording medium and the recording head 231 becomes uniform, so that recording can be kept at high accuracy.

Next, the discharge roller 153 rotates and discharges the paper 1 on which recording has been completed from a discharge outlet 201 to the outside.

As described above, in case of the first embodiment, the leading end of the recording medium, after pulled into the dimple-like suction chambers 123 once, is transported in the pulled state. Therefore, it is prevented that the leading end of the recording medium is curled up by the conventional partition wall provided in the direction perpendicular to the recording medium transporting direction, so that it is possible to bring the recording head 231 nearer to the recording medium, and recording accuracy can be further improved.

Further, in case of the second embodiment, even by a proper amount of suction force, the concave portion of cockling produced immediately after recording and the concave portion of cockling produced after completion of recording are completely pulled into the dimple-like suction chambers 123, and the recording medium can be sucked and transported. Therefore, protrusion of the convex portion of cockling from the recording medium transporting surface 122 can be surely suppressed, and the distance between the recording medium and the recording head 231 can be kept uniform. Accordingly, since it is possible to bring the recording head 231 nearer to the recording medium, the recording accuracy can be further improved. In the above embodiment, the invention is applied to the recording apparatus provided with the recording medium transporting device. However, the invention can be applied also to a liquid jet apparatus provided with a jetted material transporting device, including an ink jet printer, and the same working effects are obtained.

What is claimed is:

[1. A medium transporting apparatus mounted in a liquid jet apparatus which comprises a liquid jet head provided in a liquid jet area, the medium transporting apparatus comprising:

a transportation surface adapted to support a medium being transported, the transportation surface opposing the liquid jet head and extending to a downstream side of the liquid jet area relative to the direction that the medium is transported;

wherein a plurality of dimples are formed on said transportation surface and adapted to oppose an entire region of the medium;

wherein each of the dimples is formed with a plurality of suction holes adapted to suck the medium into the dimples;

wherein all of the dimples have closed shapes when viewed from above the transportation surface; and wherein each of the dimples extends continuously from a transportation upstream side of said transportation surface to a transportation downstream side thereof, and the suction holes in each of the dimples are arrayed in the direction that the medium is transported.]

[2. The medium transporting apparatus according to claim 1, wherein said dimples are formed so that a depth thereof on said transportation downstream side becomes larger than that on said transportation upstream side.]

[3. The medium transporting apparatus according to claim 2, wherein said dimples are formed so as to gradually become deeper from said transportation upstream side of the medium toward said transportation downstream side.]

[4. The medium transporting apparatus according to claim 2, wherein said dimples are formed so as to gradually become deeper up to a predetermined distance from said transportation upstream side of said transportation surface, and are formed so that a depth of a further part of the dimples from the predetermined distance up to the said transportation downstream side of said medium becomes constant to said transportation downstream side of the transportation surface.]

[5. The medium transporting apparatus according to claim 2, wherein said dimples are formed so that the dimples up to a predetermined distance from said transportation upstream side of said transportation surface are formed with a first depth and a further part of the dimples from the predetermined distance up to the said transportation downstream side of said transportation surface are formed with a second depth that is larger than the first depth.]

[6. The medium transporting apparatus according to claim 1, wherein the plurality of dimples are arranged in parallel in a direction perpendicular to the transporting direction of said medium.]

[7. The medium transporting apparatus according to claim 1, further comprising a suction unit including:

a plurality of suction openings provided on said medium transporting surface;

a pressure reduction chamber communicating with said suction openings; and a suction device which sucks air in said pressure reduction chamber, wherein each suction opening is provided with at least one of the suction holes communicating with said pressure reduction chamber and a suction chamber having a suction surface opposed to said medium, an area of which is larger than a cross-section of said suction holes, and said suction chambers constitutes the dimples.]

[8. A liquid jet apparatus including a jetted material transporting device having a function of the medium transporting device according to claim 1.]

[9. A recording apparatus including the medium transporting device according to claim 1.]

[10. The medium transporting apparatus of claim 1, wherein the portions of the transportation surface surrounding the dimples all lie in a single plane.]

[11. A liquid jet apparatus comprising a jetted material transporting device comprising the medium transporting apparatus device according to claim 1.]

[12. A medium transporting apparatus according to claim 1, wherein the suction holes of adjacent dimples located throughout the length of the transportation surface are aligned in a direction perpendicular to the direction in which the medium is transported.]

[13. A medium transporting apparatus mounted in a liquid jet apparatus which comprises a liquid jet head provided in a liquid jet area, the medium transporting apparatus comprising:

a transportation surface adapted to support a medium being transported, the transportation surface opposing the liquid jet head and extending to a downstream side of the liquid jet area relative to the direction that the medium is transported; and a plurality of suction chambers formed in the transportation surface and adapted to oppose an entire region of the medium;

wherein each of the suction-chambers is formed with a plurality of suction holes adapted to suck the medium into the suction chambers;

wherein all of the suction chambers have closed shapes when viewed from above the transportation surface;

wherein each suction chamber comprises a bottom surface and a wall extending around substantially the entire periphery of the bottom surface; and wherein each of the suction chambers extends continuously from a transportation upstream side of the transportation surface to a transportation downstream side of the transportation surface, and a plurality of suction holes are formed in each of the suction chambers and are arrayed in the direction that the medium is transported.]

[14. The medium transporting apparatus according to claim 13, wherein a top of the wall defines at least a portion of the medium transportation surface.]

[15. The medium transporting apparatus according to claim 14, wherein the top of the wall along the entire length of the wall lies in substantially the same plane.]

[16. The medium transporting apparatus according to claim 13, wherein a plurality of the suction chambers are arranged in parallel in a direction perpendicular to a transporting direction of said medium.]

[17. The medium transporting apparatus according to claim 13, further comprising:

a pressure reduction chamber communicating with the suction holes; and a suction device which sucks air in said pressure reduction chamber; and wherein the suction holes are formed in the bottom surface of the suction chambers.]

[18. The medium transporting apparatus according to claim 17, wherein the bottom surface of the suction chambers are opposed to the medium being transported and wherein the bottom surface of the suction chambers have a larger area than the suction holes.]

[19. A recording apparatus comprising the medium transporting device according to claim 13.]

[20. A medium transporting apparatus according to claim 13, wherein the suction holes of adjacent suction chambers located throughout the length of the transportation surface are aligned in a direction perpendicular to the direction in which the medium is transported.]

*21. A medium transporting apparatus configured to transport a medium in a transporting direction while sucking the medium, the medium transporting apparatus comprising:*

*a surface extending in the transporting direction, the surface above which the medium is transported;*

*a plurality of suction chambers adapted to oppose an entire region of the medium in a direction perpendicular to the transporting direction;*

*all of the suction chambers have closed shapes when viewed from above the surface;*

*a suction chamber of the plurality of suction chambers extending from a transportation upstream side of the surface to a transportation downstream side thereof;*

*a plurality of suction openings being formed in the suction chamber and communicating the suction chamber with a pressure reduction chamber; and*

*a suction device configured to suck air in the pressure reduction chamber,*

*wherein the suction chamber has a part in which a width of the part is larger than an aperture width of the suction openings in a direction perpendicular to the transporting direction; and*

*each suction chamber comprises a bottom surface and a wall extending around substantially the entire periphery of the bottom surface.*

*22. The medium transporting apparatus according to claim 21,*

*wherein a pair of feeding rollers are disposed at an upstream side from the surface and a pair of discharging rollers are disposed at an downstream side from the surface in the transporting direction; and*

*wherein a range of the suction chambers formed on the surface are offset to the downstream side with respect to a center between a nip portion of the feeding rollers and a nip portion of the discharging rollers in the transporting direction.*

*23. The medium transporting apparatus according to claim 21, wherein a plurality of the suction chambers are arranged in parallel in a direction perpendicular to the transporting direction.*

*24. The medium transporting apparatus according to claim 21, wherein the suction openings are arranged in the transporting direction.*

*25. The medium transporting apparatus according to claim 21,*

*wherein the suction openings are formed on a bottom surface of the suction chamber;*

*wherein the pressure reduction chamber is disposed below the surface; and*

*wherein the suction device is disposed below the pressure reduction chamber.*

*26. The medium transporting apparatus according to claim 21, wherein the suction chamber is formed so that a depth of the suction chamber on an upstream side becomes shallower than that of the suction chamber on a downstream side in the transporting direction.*

*27. The medium transporting apparatus according to claim 21, wherein the suction chamber is formed so as to gradually become deeper from an upstream side toward a downstream side in the transporting direction.*

*28. The medium transporting apparatus according to claim 26, wherein a depth of the suction chamber gradually becomes deeper from an upstream end of the suction chamber up to a predetermined position, and a depth of the suction chamber is constant from the predetermined position to a downstream end of the suction chamber.*

*29. The medium transporting apparatus according to claim 28, wherein the predetermined position corresponds to a downstream end of a recording area.*

*30. The medium transporting apparatus according to claim 24, wherein a part of the suction chamber from an upstream end thereof to a predetermined position is formed with a first depth and a further part of the suction chamber from the predetermined position to a downstream end thereof is formed with a second depth which is larger than the first depth.*

*31. The medium transporting apparatus according to claim 30, wherein the predetermined position corresponds to a downstream end of a recording area.*

*32. The medium transporting apparatus according to claim 21, wherein the suction chamber has a part of which a depth is smaller than the other part.*

*33. The medium transporting apparatus according to claim 21, wherein the suction chamber extending from a position in the vicinity of one end of the surface to a position in the vicinity of the other end of the surface.*

*34. A recording apparatus including the medium transporting apparatus according to claim 21.*

*35. A medium transporting apparatus configured to transport a medium in a transporting direction while sucking the medium, the medium transporting apparatus comprising:*

*a surface extending in the transporting direction, the surface above which the medium is transported;*

*a plurality of suction chambers adapted to oppose an entire region of the medium in a direction perpendicular to the transporting direction;*

*all of the suction chambers have closed shapes when viewed from above the surface;*

*a suction chamber of the plurality of suction chambers extending from a transportation upstream side of the surface to a transportation downstream side thereof;*

*a plurality of suction openings being formed in the suction chamber and communicating the suction chamber with a pressure reduction chamber; and*

*a suction device configured to suck air in the pressure reduction chamber,*

*wherein a width of each of the suction openings is smaller than a width of a bottom face of the suction chamber in a direction perpendicular to the transporting direction when viewed from above the surface; and*

*each suction chamber comprises a bottom surface and a wall extending around substantially the entire periphery of the bottom surface.*

*36. A medium transporting apparatus configured to transport a medium in a transporting direction while sucking the medium, the medium transporting apparatus comprising:*

*a surface extending in the transporting direction, the surface above which the medium is transported;*

*a plurality of suction chambers adapted to oppose an entire region of the medium in a direction perpendicular to the transporting direction;*

*all of the suction chambers have closed shapes when viewed from above the surface;*

*a suction chamber of the plurality of suction chambers continuously extending beyond a recording area toward a downstream side of the surface in the transporting direction;*

*a plurality of suction openings being formed in the suction chamber and communicating the suction chamber with a pressure reduction chamber; and*

*a suction device configured to suck air in the pressure reduction chamber,*

*wherein the suction chamber has a part in which a width of the part is larger than an aperture width of the suction openings in a direction perpendicular to the transporting direction; and*

*each suction chamber comprises a bottom surface and a wall extending around substantially the entire periphery of the bottom surface.*

* * * * *